July 15, 1947.  M. TAMA ET AL  2,423,912
INDUCTION FURNACE
Filed Dec. 5, 1945
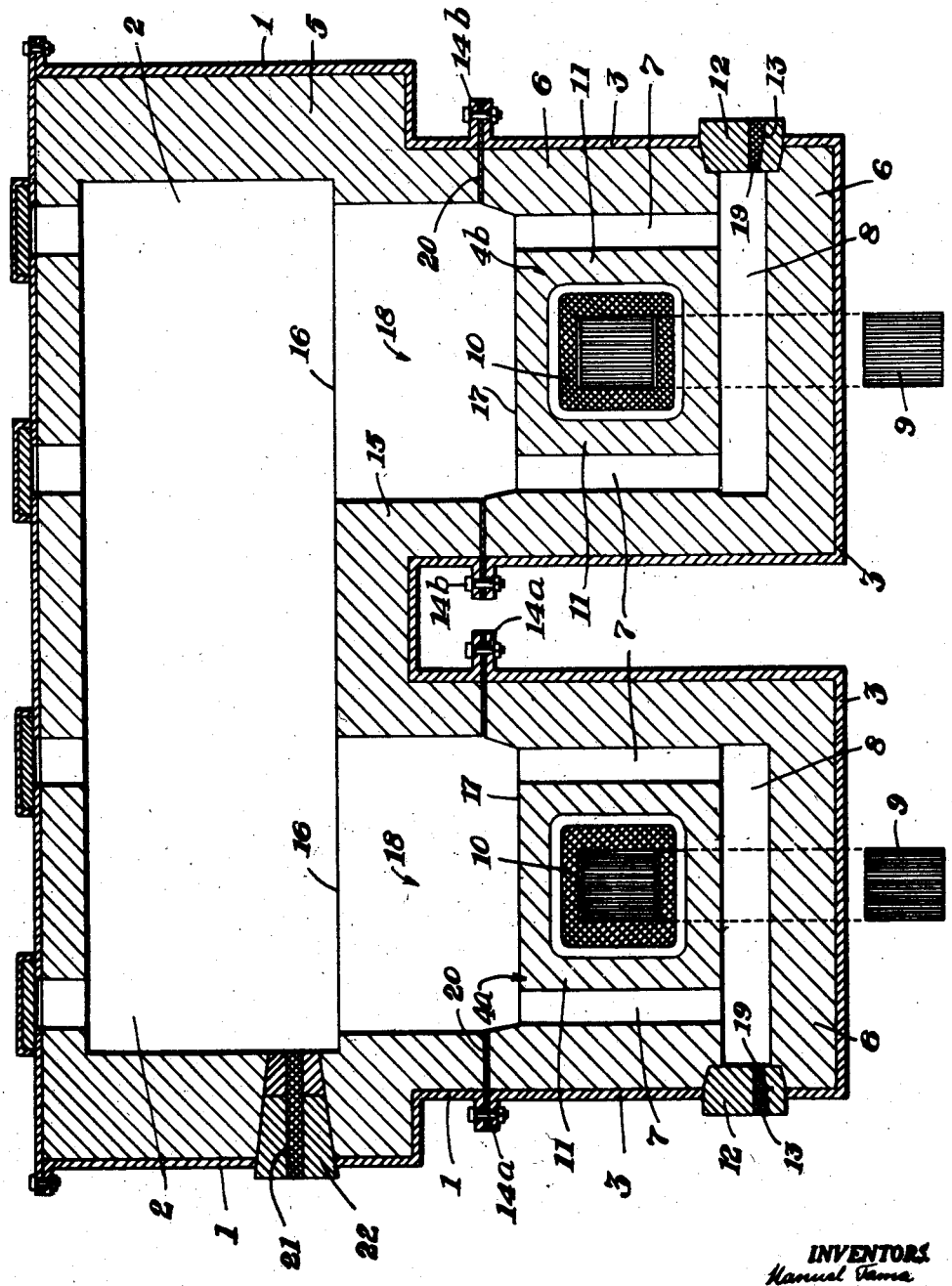
INVENTORS
Manuel Tama
Mario Tama
BY C. Freeman
ATTORNEY.

Patented July 15, 1947

2,423,912

UNITED STATES PATENT OFFICE 2,423,912

INDUCTION FURNACE

Manuel Tama and Mario Tama, Morrisville, Pa., assignors to Ajax Engineering Corporation, Trenton, N. J.

Application December 5, 1945, Serial No. 632,898

9 Claims. (Cl. 13—29)

The invention relates to an induction furnace of the submerged resistor type for melting metals and for maintaining the same in a molten condition.

Induction furnaces of this type are generally composed of an upper main section containing the hearth which holds the molten metal and a lower inductor section containing the secondary loop or loops and the transformer assemblies threading the loops.

The furnace is housed in a metal casing provided with a refractory lining; a refractory partition is located between the secondary loop and the transformer assembly, the latter consisting of a laminated iron core and a primary copper coil surrounding the same.

The upper main section of these furnaces will in the following be termed the "hearth section" and the lower section accommodating the secondary loop and the transformer assembly or assemblies will be termed the "inductor section or sections."

The refractory lining and the refractory partition separating the secondary loop and the transformer assembly are in continuous contact with the molten, hot and strongly stirred metal and therefore subjected to intense wearing stresses; these abrading and wearing stresses are particularly noticeable at the refractory lining and the partition of the inductor section which houses the transformer assembly or assemblies.

Moreover, the thickness of the refractory wall or partition between the primary transformer assembly and the secondary metal conducting loop must be reduced due to electrical reasons as much as allowable; the thicker the separating refractory is, the smaller is the coupling between the energizing coil and the secondary constituted by the molten metal. Both, the power factor and the efficiency of the furnace will decrease in relation to thickness of the separating refractory wall.

Moreover, it is inevitable that small cracks, fissures and pores are formed in the refractory. The great danger therefore prevails that the molten metal will enter these cavities of the refractory partition between the secondary loop and the transformer assembly from the side of the loop and wear its way through the refractory partition or wall; if allowed to penetrate towards the transformer assembly the molten metal will destroy the copper coil or coils, which form a valuable part of the furnace equipment. Stoppages of the furnace operation are the very awkward result of the break-through. This danger is increased when high-power inputs are used per unit of volume as the thus increased stirring action intensifies the flow velocity of the metal and accordingly its abrading action.

As apparent from the above, the lifetime of the refractory in the inductor section of the furnace is much shorter than that in the hearth section and the refractory of the inductor section wears out much quicker than that of the hearth section. It is therefore desirable to make provisions for a replacement of the inductor section or units of the furnace. Various attempts have been made to cope with this problem.

The induction furnaces have been provided with cylindrical metal holding chambers of large capacity and small capacity melting chambers surrounded by energizing coils have been replaceably attached to the metal holding cylinder. In case of damage to a metal melting chamber the same is removed and replaced by another melting chamber structure.

In accordance with another proposition to overcome the here described difficulties one or more straight replaceable sections were provided to be inserted into and to complete the secondary loop.

Tiltable and rotatable induction furnaces have been provided with lateral replaceable inductor units; in order to replace the same, the furnace must be laterally turned or tilted whereby it is rendered possible to keep the non-defective inductor unit charged with the molten metal.

However, in all cases of the prior art remedy structures the disadvantage arose that the furnace operation is either interrupted or that the furnace position must be changed when the defective inductor unit is replaced.

It therefore is the primary object of the invention to provide a stationary induction furnace of the submerged resistor type with inductor sections or units which latter can be replaced without an interruption of the furnace operation and without incurring a change of position of the furnace.

It is another object of the invention to keep a stationary induction furnace filled with a sufficient quantity of molten metal during the replacement of a defective inductor unit which will permit an uninterrupted supply of the current.

It is another object of the invention to provide a stationary induction furnace of the submerged resistor type in which the inductor units including the secondary loop and the transformer assembly may be detached from the hearth section in a very simple manner and may be quickly substituted by another inductor unit.

It is also an object of the invention to permit the uninterrupted operation in certain parts of a stationary induction furnace while in other parts of the same the replacement of a defective inductor unit is performed.

With the above recited and other objects in view which will become apparent as this specification proceeds, the invention comprises in its broadest aspect the provision of means which will permit the continued supply of current to a stationary induction furnace in order to keep the charge in a restricted part of the hearth and in an inductor unit in the molten state, while emptying the charge from the main part of the hearth and another inductor section and replacing the latter.

The invention is illustrated by way of example in the accompanying drawing which shows a vertical sectional view of a submerged resistor type induction furnace in which the invention is embodied.

The furnace is composed of an upper or hearth section and a plurality of lower or inductor sections; in the illustrated embodiment of the invention two inductor units are shown.

These inductor units are separable from the hearth section. A casing 1 is provided having refractory lining 5; this casing houses the upper furnace section containing hearth 2; casings 3 having a refractory lining 6 house the inductor units 4ª, 4ᵇ.

The inductor units are demountable from the hearth section and are individually replaceable; the hearth may preferably have an oval cross section.

The two inductor units have an equal construction. They contain a secondary loop formed of two vertical channels 7 and a horizontal channel 8; the channels have preferably the shape and cross section disclosed in applicant's patents, Nos. 2,339,964, 2,342,617, 2,347,298, 2,375,049, 2,381,523.

The secondary loop is threaded by the primary consisting of a laminated iron core 9 surrounded by a copper coil 10; a refractory partition 11 separates the secondary loop from the primary.

The bottom channel of each inductor unit is closed by a refractory plug 12; the plug has a small bore 13 which during the operation of the furnace is closed with a suitable filling material such as a clay mixture 19; the plug holes 13 can be easily opened if the inductor unit is to be replaced and the metal emptied for this purpose.

Bolts 14ª and 14ᵇ are provided to unite and to separate the upper hearth section and the inductor units 4ª, 4ᵇ. The voids 20 between the hearth and the inductor sections are sealed with a suitable refractory cement.

An important feature of the furnace resides in the provision of wall 15 located in the lower or bottom portion of the hearth; the wall extends in the shown embodiment of the invention through the width of the hearth and divides the bottom portion of the hearth space between levels 16 and bottom level 17 in two chambers 18, which are not connected with each other.

The operation of the furnace and particularly the replacement of the inductor units will now be described in detail.

It is assumed that inductor unit 4ª requires replacement.

In this case hearth 2 is emptied through bore 21 of plug 22 until the molten metal reaches level 16. Now bore 13 of induction unit 4ª is opened and the metal entirely emptied from the residual hearth space 18 and from inductor unit 4ª; the bolts 14ª connecting the hearth section with inductor unit 4ª are loosened; inductor unit 4ª is removed and interchanged for a new unit, which is secured in place by bolts 14ª after a sealing refractory has been poured into voids 20.

Due to the partition 15 inductor unit 4ᵇ and a restricted bottom portion 18 of the hearth situated above inductor unit 4ᵇ remained filled with molten metal up to level 16.

The supply of the current to inductor section has not been interrupted during the substitution of inductor unit 4ª and the metal has been kept in the molten state. The operation of the furnace has not been stopped, its position has not been changed and the furnace did not cool down.

After the new inductor section has been secured in place and void 20 between the inductor section and the hearth section has been sealed, the furnace can again be charged to full capacity.

As stated above, the important feature of the invention is the provision of means for the maintenance of a certain quantity of molten metal in the furnace hearth of a stationary induction furnace during the replacement of an inductor unit as this will permit the furnace to be held in operation. This residue of molten metal which remains in the furnace during the replacement of an inductor should be sufficient to keep the furnace hot during the period of exchange.

We claim:

1. In a stationary submerged resistor type induction furnace for melting metals an upper hearth section, a plurality of inductor units interchangeably connected with said hearth section, means to empty the molten metal from the main portion of the hearth, means to empty the molten metal from an inductor unit prior to its exchange for another inductor unit and a refractory structure located in the bottom portion of the hearth projecting over the bottom level thereof and ending short of the level of the hearth emptying means adapted to retain a residual quantity of molten metal in the hearth and in another inductor unit.

2. In a stationary submerged resistor type induction furnace for melting metals an upper hearth section, a plurality of inductor units interchangeably connected with said hearth section, means to empty the molten metal from the main space of the hearth and from an inductor unit prior to its exchange for another inductor unit and a refractory wall located in the bottom part of the hearth extending through the width thereof, said wall adapted to retain a residual quantity of molten metal in the hearth and in another inductor unit.

3. In a stationary submerged resistor type induction furnace for melting metals an upper hearth section, two inductor units located underneath said upper hearth section and interchangeably connected therewith, means to empty the molten metal from the main portion of the hearth and from an inductor unit prior to its exchange for another inductor unit and means extending through the bottom portion of the hearth along a vertical plane between said two inductor units adapted to retain a residual quantity of molten metal in the hearth and in another inductor unit.

4. In a stationary submerged resistor type induction furnace for melting metals an upper hearth section, a casing having a refractory lining housing said upper hearth section, a plurality of inductor units, casings having a refractory lining housing said inductor units, means to interchangeably connect said inductor units and casings with said hearth casing, means to empty the molten metal from the main space of the hearth and from an inductor unit prior to its exchange for another inductor unit and a refractory wall located in the bottom part of the hearth extending through the width thereof, said wall adapted to retain a residual quantity of molten metal in the hearth and in another inductor unit.

5. In a stationary submerged resistor type induction furnace for melting metals an upper hearth section, a casing having a refractory lining housing said upper hearth section, a plurality of inductor units, means to interchangeably connect said inductor units and casings with said hearth casing, means to empty the molten metal from the main space of the hearth and from an inductor unit prior to its exchange for another inductor unit, a secondary loop system composed of vertical lateral channels and a bottom channel in said inductor units, an opening through said inductor casings extending into the one end of said bottom channel, a plug to close said opening, a closeable bore in said plug to empty the molten metal from an inductor unit prior to its exchange for another inductor unit and means in said hearth adapted to retain a residual quantity of molten metal in the same and in another inductor unit.

6. In a stationary submerged resistor type induction furnace for melting metals an upper hearth section, a casing having a refractory lining housing said upper hearth section, a plurality of inductor units, casings having a refractory lining housing said inductor units, means to interchangeably connect said inductor units and casings with said hearth casing, means to empty the molten metal from the main space of the hearth and from an inductor unit prior to its exchange for another inductor unit, a secondary loop system composed of lateral vertical channels and a bottom channel in said inductor units, an opening through said inductor casings extending into the one end of said bottom channel, a plug to close said opening, a closeable bore in said plug to empty the molten metal from an inductor unit prior to its exchange for another inductor unit and a refractory wall located in the bottom part of the hearth extending through the width thereof, said wall adapted to retain a residual quantity of molten metal in the hearth and in another inductor unit.

7. In a stationary submerged resistor type induction furnace for melting metals an upper hearth section, a casing having a refractory lining housing said upper hearth section, means to empty the molten metal from the main portion of said hearth section, a plurality of inductor units, casings having a refractory lining housing said inductor units, means to interchangeably connect said inductor units and casings with said hearth casing, means to empty the molten metal from the main space of the hearth and from an inductor unit prior to its exchange for another inductor unit, a secondary loop system composed of lateral vertical channels and a bottom channel in said inductor units, an opening through said inductor casings extending into the one end of said bottom channel, a plug to close said opening, a closeable bore in said plug to empty the molten metal from an inductor unit prior to its exchange for another inductor unit and means in said hearth adapted to retain a residual quantity of molten metal in the same and in another inductor unit.

8. In a stationary submerged resistor type induction furnace for melting metals an upper hearth section, a casing having a refractory lining housing said upper hearth section, means to empty the molten metal from the main portion of said hearth section, a plurality of inductor units, casings having a refractory lining housing said inductor units, means to interchangeably connect said inductor units and casings with said hearth casing, means to empty the molten metal from the main space of the hearth and from an inductor unit prior to its exchange for another inductor unit, a secondary loop system composed of lateral vertical channels and a bottom channel in said inductor units, an opening through said inductor casings extending into the one end of said bottom channel, a plug to close said opening, a closeable bore in said plug to empty the molten metal from an inductor unit prior to its exchange for another inductor unit and a refractory wall located in the bottom part of the hearth extending through the width thereof, said wall adapted to retain a residual quantity of molten metal in the hearth and in another inductor unit.

9. In a stationary submerged resistor type induction furnace for melting metals an upper hearth section, a plurality of inductor units interchangeably connected with said hearth sections, means to empty the molten metal from the main portion of the hearth, means to empty the molten metal from an inductor unit prior to its exchange for another inductor unit and a refractory structure located in the bottom of the hearth projecting over the entering level of said inductor units into said hearth and ending short of the level of the hearth emptying means, adapted to retain a residual quantity of molten metal in the hearth and in another inductor unit.

MANUEL TAMA.
MARIO TAMA.

REFERENCES CITED

The following references are of record in the file of this patent:

UNITED STATES PATENTS

| Number | Name | Date |
| --- | --- | --- |
| Re. 18,362 | De Zubiria | Feb. 23, 1932 |
| 1,201,671 | Wyatt | Oct. 17, 1916 |
| 1,479,582 | Brayton, Jr. | Jan. 1, 1924 |
| 1,640,826 | Foley | Aug. 30, 1927 |
| 875,801 | Gin | Jan. 7, 1908 |
| 1,589,266 | Summey | June 15, 1926 |